(12) United States Patent
Aitchison et al.

(10) Patent No.: US 8,475,676 B2
(45) Date of Patent: Jul. 2, 2013

(54) ELECTROLYTE

(75) Inventors: Phillip Brett Aitchison, New South Wales (AU); Hung Chi Nguyen, New South Wales (AU)

(73) Assignee: CAP-XX Limited, Sydney (AU)

( * ) Notice: Subject to any disclaimer, the term of this patent is extended or adjusted under 35 U.S.C. 154(b) by 567 days.

(21) Appl. No.: 12/223,111

(22) PCT Filed: Mar. 7, 2007

(86) PCT No.: PCT/AU2007/000284
§ 371 (c)(1),
(2), (4) Date: Jul. 23, 2008

(87) PCT Pub. No.: WO2007/101303
PCT Pub. Date: Sep. 13, 2007

(65) Prior Publication Data
US 2010/0046142 A1 Feb. 25, 2010

(30) Foreign Application Priority Data

Mar. 8, 2006 (AU) .............................. 2006901174

(51) Int. Cl.
*H01M 6/14* (2006.01)
*H01M 14/00* (2006.01)
*H01G 9/022* (2006.01)

(52) U.S. Cl.
USPC .......... 252/62.2; 429/339; 361/502; 361/503; 361/504; 361/505

(58) Field of Classification Search
USPC ................. 252/62.2; 429/339; 361/502, 503, 361/504, 505
See application file for complete search history.

(56) References Cited

U.S. PATENT DOCUMENTS 4,882,244 A * 11/1989 Donahue et al. ............... 429/339
6,356,432 B1 * 3/2002 Danel et al. .................... 361/502
(Continued)

FOREIGN PATENT DOCUMENTS

WO 9854739 A1 12/1998
WO 9953510 A1 10/1999
(Continued)

OTHER PUBLICATIONS

Conway, B. E. "The Electrolyte Factor in Supercapacitor Design and Performance: Conductivity, Ion-Paring and Solvation", The Fourth International Seminar on Double Layer Capacitors and Similar Energy Storage Devices, Dec. 12-14, 1994, vol. 4, held at Ocean Resort Hotel and Conference Centre, Deerfield Beach, Fla. and co-ordinated by Florida Educational Seminars, Inc., 1900 Glades Road, Suite 358, Boca Raton, Fla. 33431.

*Primary Examiner* — Carol M Koslow
(74) *Attorney, Agent, or Firm* — Kenyon & Kenyon LLP

(57) ABSTRACT

Electrolyte for use in an energy storage device such as a capacitor or supercapacitor which comprises a solvent (preferably propionitrile) and an ionic species (preferably methyltriethylammonium tetrafluoroborate). The electrolytes provide a low ESR rise rate, a high voltage and permit operation over a wide range of temperatures, which makes them beneficial for use in a range of energy storage devices such as digital wireless devices, wireless LAN devices, mobile telephones, computers, electrical or hybrid electrical vehicles.

36 Claims, 3 Drawing Sheets

U.S. PATENT DOCUMENTS

| | | | |
|---|---|---|---|
| 6,461,773 B1 * | 10/2002 | Tsujioka et al. | 429/306 |
| 6,491,841 B1 * | 12/2002 | Maletin et al. | 252/62.2 |
| 6,535,373 B1 * | 3/2003 | Smith et al. | 361/504 |
| 6,552,895 B1 * | 4/2003 | Vassallo et al. | 361/517 |
| 6,602,742 B2 * | 8/2003 | Maletin et al. | 438/142 |
| 6,896,807 B1 | 5/2005 | Smith et al. | |
| 6,902,684 B1 * | 6/2005 | Smith et al. | 252/62.2 |
| 7,719,820 B2 * | 5/2010 | Degen et al. | 361/502 |
| 2003/0142464 A1 | 7/2003 | Liu et al. | |
| 2004/0218347 A1 | 11/2004 | Schwake | |
| 2005/0047061 A1 | 3/2005 | Sugo et al. | |

FOREIGN PATENT DOCUMENTS

| | | |
|---|---|---|
| WO | 0016352 A1 | 3/2000 |
| WO | 0034964 A1 | 6/2000 |
| WO | 0104920 A1 | 1/2001 |
| WO | 0116971 A1 | 3/2001 |
| WO | 0189058 A1 | 11/2001 |
| WO | 0189644 A1 | 11/2001 |
| WO | 0205301 A1 | 1/2002 |
| WO | WO 2004/079759 A2 | 9/2004 |
| WO | 2006/012890 A1 | 2/2006 |
| WO | WO 2006/012890 * | 2/2006 |

* cited by examiner

ELECTROLYTE

This is a 371 national phase application of PCT/AU2007/000284 filed 7 Mar. 2007, which claims priority to Australian Patent Application No. 2006901174 filed 8 Mar. 2006, the contents of which are incorporated herein by reference.

TECHNICAL FIELD

The invention relates to electrolytes for use in energy storage devices. In particular, the invention relates to non-aqueous electrolytes capable of high temperature & high voltage operation in capacitors and supercapacitors.

The invention has been developed primarily for supercapacitors and will be described hereinafter with reference to that application. It will be appreciated, however, that the invention is not limited to that particular field of use and is also suitable for other energy storage devices such as batteries, fuel cells, pseudocapacitors and capacitors and hybrids of one or more of these devices.

BACKGROUND ART

Supercapacitors, alternatively known as ultracapacitors, electrical double layer capacitors or electrochemical capacitors, are energy storage devices that have considerably more specific capacitance than conventional capacitors. Low resistance supercapacitors are ideally suited for high power applications. Examples include: mobile wireless communications devices, such as those using GSM (Global System for Mobile communication) and GPRS (General Packet Radio Service) wireless technologies or fixed wireless systems such as Automated Meter Readers (AMR). Other examples include: electronic stimulation of materials, such as light emitting diodes (LED) for a camera flash, and; electrical actuation of a physical devices as varied as a solenoid for a door lock, an electric motor for a camera lens or vehicle propulsion.

Supercapacitors can play a role in hundreds of applications. The energy and power storage markets, where supercapacitors reside, are currently dominated by batteries and capacitors. It is well recognised that batteries are good at storing energy but compromise design to enable high power delivery of energy. It is also well recognised that capacitors enable fast (high power) delivery of energy, but that the amount of energy delivered is very low (low capacitance). Overlaying these limitations of existing batteries and capacitors against market demand reveals the three main areas of opportunity for supercapacitors: battery replacement devices, which have high energy density; battery complement devices. which have high power and energy densities, and; capacitor replacement devices which are smaller and not only have high power density but have high frequency response.

Currently, the relatively high power density of supercapacitors make them ideal for series or parallel combination with batteries that have high energy density to form a hybrid energy storage system. When a load requires energy that is not constant, complementing the battery with a supercapacitor allows the peaks to be drawn from the charged-up supercapacitor. This reduces the load on the battery and in many cases extends the lifecycle of a battery as well as the lifetime of rechargeable batteries.

Modern mobile devices require power systems that are capable of dealing with large fluctuations in the load. For example, a mobile telephone has a variety of modes each with a different load requirement. There is a stand-by mode, which requires low power and is relatively constant. However, this mode is periodically punctuated by the need to find the nearest base station and a signal is sent and received, requiring a higher load. In full talk mode where continuous contact to a base station is required, the load takes the form of a periodic signal where the instantaneous load is quite different from the average. A number of communication protocols exist, such as GSM and GPRS, but they are all characterized with a periodic load. A supercapacitor in-parallel with a battery is particularly suited to this application because the power from the supercapacitor is used during the high loads that are usually short in duration and the energy from the battery can recharge the supercapacitor and supply a base load during the time of low power demand. As further miniaturization of digital wireless communication devices occur, leading to decreased battery sizes, the need for supercapacitors will increase.

Supercapacitors also have application in the field of Hybrid Electric Vehicles (HEV). Supercapacitors can be used as an integral component of the drivetrains of these vehicles and are used as the primary power source during acceleration and for storage of energy reclaimed during regenerative braking. Such vehicles could conceivably halve a motorist's fuel bill and slash emissions by up to 90%.

Capacitance arises when two parallel plates are connected to an external circuit and a voltage difference is imposed between the two plates, the surfaces become oppositely charged. The fundamental relationship for this separation of charges is described by the following equation $$C = \frac{\varepsilon A}{L}$$

where C denotes capacitance with a unit of farads (F), $\varepsilon$ is the permittivity with a unit of farads per meter (m), A is the area of overlap of the charged plates and L is the separation distance. The permittivity of the region between the plates is related to the dielectric constant of the material that can be used to separate the charged surfaces.

The problem with existing commercial capacitors using conventional materials is that their performance is limited by their dimensions. For example, a capacitor based around a metallized coating of a polyethylene sheet that is 50 µm thick will develop only 0.425 µF for one square meter of capacitor. Thus, over 2.3 million square meters will be required to develop 1 F.

The supercapacitors developed by the present applicant are disclosed in detail in the applicants copending applications, for example, PCT/AU98/00406, PCT/AU99/00278, PCT/AU99/00780, PCT/AU99/01081, PCT/AU00/00836 and PCT/AU01/00553, the contents of which are incorporated herein by reference.

These supercapacitors developed by the applicant overcome the dimensionality problem described above by using as a coating material an extremely high surface area carbon.

These supercapacitors include two opposed electrodes. These electrodes are maintained in a predetermined spaced apart electrically isolated configuration by an intermediate electronically insulating separator. In very broad terms, the electrodes consist of metal current collectors and a coating material, in that the metal offers significantly less resistance than the coating material. The coating is typically formed from a particulate carbon or carbons and a binder used for adhering the carbon to itself and to the associated current collector.

The coated electrodes and intermediate separator can be either stacked or wound together and disposed within a housing that contains an electrolyte. Two current collecting terminals are then connected to and extend from respective electrodes for allowing external access to those electrodes. The housing is sealed to prevent the ingress of contaminants and the egress of the electrolyte. This allows advantage to be taken of the electrical double layer that forms at the interface between the electrodes and the electrolyte. That is, there are two interfaces, those being formed between the respective electrodes and the electrolyte. This type of energy storage device is known as a supercapacitor. Alternatively, these have been known as ultracapacitors, electrical double layer capacitors and electrochemical capacitors.

The electrolyte contains ions that are able to freely move throughout a matrix, such as a liquid or a polymer, and respond to the charge developed on the electrode surface. The double layer capacitance results from the combination of the capacitance due to the compact layer (the layer of solvated ions densely packed at the surface of the electrode) and the capacitance due to the diffuse layer (the less densely packed ions further from the electrode).

In supercapacitors, the compact layer is generally very thin, less than a nanometer, and of very high surface area. This is where the technological advantage for supercapacitors over conventional capacitors lies, as charge storage in the extremely thin compact layer gives rise to specific capacitances of approximately 0.1 F/m$^2$. This is an increase by several hundred thousand-fold over conventional film capacitors. As well, the applied potential controlled, reversible nanoscale ion adsorption/desorption processes result in a rapid charging/discharging capability for supercapacitors.

The electrode material may be constructed as a bed of highly porous carbon particles with a very high surface area. For example, surface areas may range from 100 m$^2$ per gram up to greater than 2500 m$^2$ per gram in certain preferred embodiments. The carbon matrix is held together by a binding material that not only holds the carbon together (cohesion) but it also has an important role in holding the carbon layer onto the surface of the current collecting substrate (adhesion).

The current collecting substrate is generally a metal foil. The space between the carbon surfaces contains an electrolyte (frequently solvent with dissolved salt). The electrolyte is a source of ions which is required to form the double layer on the surface of the carbon as well as allowing ionic conductance between opposing electrodes. A porous separator is employed to physically isolate the carbon electrodes and prevent electrical shorting of the electrodes.

The energy storage capacity for a supercapacitor can be described by the equation $$E = \frac{1}{2}CV^2$$

where E is the energy in joules, C is the capacitance in farads and V is the rated or operating voltage of the supercapacitor. Apart from the voltage limitation, it is the size of the supercapacitor that controls the amount of energy stored, and the distinguishing feature of supercapacitors are the particularly high values of capacitance. Another measure of supercapacitor performance is the ability to store and release the energy rapidly; this is the power, P, of a supercapacitor and is given by $$P = \frac{V^2}{4R}$$

where R is the internal resistance of the supercapacitor. For capacitors, it is more common to refer to the internal resistance as the equivalent series resistance or ESR. As can be deduced from the foregoing equations, the power performance is strongly influenced by the ESR of the entire device, and this is the sum of the resistance of all the materials, for instance, substrate, carbon, binder, separator, electrolyte and the contact resistances as well as between the external contacts.

One variable of interest in the field of supercapacitors that has yet to be fully explored is the nature of the electrolyte involved. The electrolyte is typically one or more solvents containing one or more dissolved ionic species. In many cases, the physical and electrochemical properties of electrolyte are a key factor in determining the internal resistance (ESR) of the supercapacitor and the "power spectrum" of the supercapacitor, ie the ability of the supercapacitor to provide power over various time domains or in various frequency ranges.

The factors influencing the conductance ($\kappa$) of an electrolyte solution are described in detail in an article by B. E. Conway taken from "The Fourth International Seminar on Double Layer Capacitors and Similar Energy Storage Devices", Dec. 12-14, 1994, held at Ocean Resort Hotel and Conference Centre, Deerfield Beach, Fla. and co-ordinated by Florida Educational Seminars, Inc., 1900 Glades Road, Suite 358, Boca Raton, Fla. 33431.

In summary, there are two principle factors which are involved in determining the conductance—these are:
a) the concentration of free charge carriers, cations and anions; and
b) the ionic mobility or conductance contribution per dissociated ion in the electrolyte.

There are a number of sub factors which in turn influence these two principle factors. These are:
  The solubility of the selected salt.
  The degree of dissociation into free ions and factors such as the extent of ion-pairing of the ionic species. This in turn is influenced by the salt concentration, temperature and the dielectric constant of the solvent.
  The viscosity of the solvent, which is a temperature dependent property. As temperature increases, there is a corresponding decrease in viscosity.

Solvents for supercapacitors can thus be designed with the following criteria in mind:
  Solvency for selected ionic species
  Degree of dissociation of cation/anion pairing in solution
  Dielectric constant
  Electron-pair donicity
  Permits high ion mobility
  Extent of solvation of free ions and radii of solvated ions
  Temperature coefficient of viscosity (ie low viscosity in the intended temperature range); and
  Ion pairing equilibria.

There is also the necessity for the solvent to be chemically stable. Aqueous based electrolytes, such as sulfuric acid and potassium hydroxide solutions, are often used as they enable production of an electrolyte with high conductivity. However, water is susceptible to electrolysis to hydrogen and oxygen on charge and as such has a relatively small electrochemical window of operation outside of which the applied voltage will degrade the solvent. In order to maintain electrochemical stability in applications requiring a voltage in excess of 1.0 V, it is necessary to employ supercapacitor cells in series, which leads to an increase in size, a reduction in capacitance and in increase in ESR in relation to a non-aqueous device which is capable of producing an equivalent voltage. Stability is important when one considers that the supercapacitors may remain charged for long periods and must charge and discharge many hundreds of thousands of times during the operational lifetime of the supercapacitor.

There are of course processing requirements on the solvent also, such as cost, toxicity, purity and dryness considerations for non-aqueous systems.

Non aqueous solvents commonly used in related fields, eg batteries, can be classified as: high dielectric constant aprotic (e.g. organic carbonates), low dielectric constant with high donor number (e.g. dimethoxyethane, tetrahydrofuran or dioxolane), low dielectric constant with high polarisability (e.g. toluene or mesitylene) or intermediate dielectric constant aprotic (e.g. dimethylformamide, butyrolactone) solvents.

However, in addition to the specific electrolyte requirements of supercapacitors mentioned above, there is also the practical consideration that supercapacitors do not operate in isolation. Rather, in use, they are in confined environments in the presence of components which generate high temperatures, and like the other components, this must be borne in mind when selecting the electrolyte solvent. Also, it needs to be borne in mind that the supercapacitors must be capable of operation at start-up at temperatures much lower (even into the sub zero range) than the high operating temperatures referred to above.

The energy storage of batteries, in contrast to the power delivery of supercapacitors, is not critically dependent on the contribution of the electrolyte to the ESR of the cell, although even in batteries, low ESR is desirable. Solvents which have high boiling points invariably have high viscosities, and consequently, low charge mobilities at low temperatures. High boiling solvents, such as cyclic ethers and lactones can therefore be used in batteries with less regard to what would be an unacceptably high ESR in supercapacitors.

Supercapacitors thus present a unique set of requirements for the solvents used.

Acetonitrile has previously been used the main electrolyte solvent in supercapacitors because of its high conductivity and good solvency, which allows a variety of ionic agents to be used over a range of temperatures.

Power increases in supercapacitors can be achieved by operating at higher voltages. The power capability of a capacitor is proportional to the square of the voltage. Whilst acetonitrile has been suitable for low voltage devices, it has been found to lose stability above 2.5 volts and is not useable for long periods at or above about 2.75 volts.

As supercapacitors evolve and are being pushed to higher levels of performance, the measurement criteria for their performance becomes more stringent. One measurement of ongoing supercapacitor performance is the ESR rise rate—this is the upward drift in ESR over time towards unacceptably high levels. ESR rise rate is a function of the overall stability of the system relative to time and the number of times a device cycles. Acetonitrile has proven in some cases to give unacceptably high ESR rise rates.

Accordingly, as the field of supercapacitors evolves, there is a continuing need for new solvents and electrolyte systems that exhibit better stability and operational characteristics.

It is an object of the present invention to provide a non-aqueous solvent suitable for use in the energy storage device which overcomes one or more of the above mentioned disadvantages, or at least provides a commercially viable alternative.

SUMMARY OF THE INVENTION

According to a first aspect, the present invention provides an electrolyte for use in an energy storage device, said electrolyte comprising a solvent and an ionic species, wherein the solvent is propionitrile.

The ionic species is preferably a salt, and more preferably a salt selected from lithium tetrafluoroborate, tetrabutylammonium perchlorate, tetrabutylammonium hexafluorophosphate, tetraethylammionium trifluoromethylsulfonate, methyltriethylammonium perchlorate, methyltriethylammonium tetrafluoroborate, methyltriethylammonium trifluoromethylsulfonate and mixtures thereof.

Salts such as tetraethylammonium tetrafluoroborate, tetrabutylammonium tetrafluoroborate, tetrabutylammonium hexafluoroborate and the like may also be used in an appropriately solubilized form.

In addition to fluoroborates and perchlorates, any other soluble salts may be used, eg lithium, sodium, potassium salts and the like.

The most preferred salt is methyltriethylammonium tetrafluoroborate, $MeEt_3N^+BF_4^-$ (MTEATFB).

The ionic species may be present in any amount up to saturation, or in greater or lesser quantities such as 1 molar and in an amount sufficient to allow an energy storage device to function over the desired temperature range.

According to a second aspect, the invention provides an electrolyte for use in an energy storage device, said electrolyte comprising a solvent and methyltriethylammonium tetrafluoroborate (MTEATFB)

The solvent is preferably a non aqueous solvent More preferably, the solvent is selected from: ethylene carbonate, propylene carbonate, butylene carbonate, γ-butyrolactone, γ-valerolactone, acetonitrile, glutaronitrile, adiponitrile, methoxyacetonitrile, 3-methoxypropionitrile, N,N-dimethylformamide, N,N-dimethylacetamide, N-methypyrrolidinone, N-methyloxazolidinone, N—N'-dimethylimisazolidinone, nitromethane, nitroethane, sulfolane, dimethyl sulfoxide, trimethyl phosphate, 1,2-dimethoxyethane, tetrahydrofuran, 2-methyltetrahydrofuran, 1,3-dioxolane, 4-methyl-1,3-dioxolane, methyl formate, methyl acetate, methyl propionate, dimethyl carbonate, ethyl methyl carbonate, diethyl carbonate, methyl propyl carbonate, 1-methyl-2-pyrrolidone, 1,2-dichloroethane, sulphuryl chloride, thionyl chloride, acetyl chloride, tetrachloroethylene carbonate, benzoyl chloride, dichloroethylene carbonate, nitrobenzene, acetic anhydride, phosphorus oxychloride, benzonitrile, selenium oxychloride, propanediol-1,2-carbonate, benzylcyanide (nitrile), ethylene sulphite, iso-butyronitrile, propionitrile, phenylphosphonic difluoride, n-butyronitrile, acetone, ethyl acetate, phenylphosphonic dichloride, diethyl ether, diphenyl phosphonic chloride, trimethyl phosphate, tributyl phosphate, pyridine, hexamethyl phosphoramide and the like.

More preferably, the solvent is a nitrile, and most preferably propionitrile.

According to a third aspect, the invention provides an electrolyte for use in an energy storage device comprising propionitrile and methyltriethylammonium tetrafluoroborate.

In one highly preferred embodiment, a 1 molar solution of MTEATFB in propionitrile has a conductivity of at least 28 mS/cm at 23° C., and also preferably at least 48 mS/cm at 95°

C. Although it can be appreciated that lower concentrations and conductivities can give acceptable energy and power under certain conditions.

According to a fourth aspect, the invention provides an electrolyte according to any one of the preceding aspects, which, when used in a supercapacitor, provides a low ESR rise rate.

According to a fifth aspect, the invention provides an electrolyte according to any one of the preceding aspects, which, when used in a supercapacitor, provides a high voltage.

According to a sixth aspect, the invention provides an electrolyte according to any one of the preceding aspects, which, when used in a supercapacitor, permits operation over a wide range of temperatures. Preferably, the electrolyte permits operation at high temperatures. Also preferably, the electrolyte permits operation at low temperatures. Most preferably, the electrolyte permits operation at both high temperatures and low temperatures.

According to a seventh aspect, the invention provides an energy storage device including an electrolyte according to any one of the preceding aspects. Most preferably, the energy storage device is a capacitor or supercapacitor, for example a carbon based supercapacitor. The energy storage devices of the present invention may be in the form of cells or devices, and may include a number of cells in series or parallel.

According to an eighth aspect, the invention provides an energy storage device including an electrolyte according to any one of the preceding aspects. Preferably, the energy storage device is a hybrid capacitor or hybrid supercapacitor with one of the two electrodes being carbon based and forming a double-layer. Also preferably, the second electrode does not substantially form a double-layer. More preferably, the second electrode stores energy by reduction or oxidation.

According to an ninth aspect the invention provides a supercapacitor having an electrolyte comprising propionitrile and MTEATFB.

The supercapacitor may be of any construction, such as disclosed in our previous applications, PCT/AU99/00780; PCT/AU99/01081; PCT/AU98/00406, PCT/AU01/00838, PCT/AU01/00836, PCT/AU01/00613, PCT/AU00/01029 PCT/AU99/00278, the disclosure of which is incorporated herein by reference.

The general feature of such a supercapacitor is that it comprises a charge storage cell including: (a) a first electrode; (b) a second electrode being opposed to and spaced apart from the first electrode; and
(c) a porous separator disposed between the electrodes;
a sealed package for containing the cell and an electrolyte in which the cell is immersed; and
at least two terminals extending from the package to allow external electrical connection to the cell.

More preferably, the supercapacitor includes a housing; at least two opposed electrodes disposed within the housing; a separator disposed intermediate the electrodes; an electrolyte disposed intermediate the electrodes. Preferably, terminals extend from the electrodes to allow incorporation into a circuit.

The supercapacitor may be rigid or flexible.

The electrodes may be sheet electrodes. The separator is preferably permeable or porous.

The electrodes, electrolyte and separator are preferably housed within a sealed package, which may include a plurality of layers such as electrolyte barrier layers and a strengthening layers. The electrodes are immersed in the electrolyte.

A plurality, or stack, of spaced electrodes may be present in the supercapacitors of the present invention. These include a plurality of first sheet electrodes having respective first tabs extending therefrom; a plurality of second sheet electrodes alternated with the first electrodes and having respective second tabs extending therefrom;
a porous separator disposed between adjacent electrodes; and
a sealed package for containing the electrodes, the separator and an electrolyte, whereby the first tabs are electrically connected to a first terminal and the second tabs are electrically connected to a second terminal, both the first and second terminals extending from the package to allow external electrical connection to the respective electrodes.

According to a tenth aspect, the present invention provides a supercapacitor having a DC Capacitance (C) of at least 15 F/g (Farads per gram). DC Capacitance is determined from the rate of change in voltage (dV/dt) of the capacitor when it is discharged at a constant current (I), typically between two predetermined voltages or times that define an area of approximately linear change. This determination is made according to the equation:

$$C = I(dt/dV)$$

The discharge current used here is typically 200 mA (milli-Amperes), with dV being measured between approximately 1.5 V and 0.5V. The weight used here to calculate the specific gravimetric capacitance is that of the total mass of coating on the electrodes in the device.

According to an eleventh aspect, the present invention provides a supercapacitor having an Effective Capacitance (Ce) of at least 1.0 F/g at 1 ms (millisecond) and at least 3.0 F/g at 100 ms. Effective Capacitance (Ce) is the capacitance obtained during a constant current discharge at a specified time and is derived from an RC electrical model of the supercapacitor's measured discharge, where R (or ESR) is measured at 20 µs (microseconds) and held constant in the model. The discharge current used here is typically 100 mA. The weight used here to calculate the specific gravimetric Effective Capacitance is that of electrode coating comprising the device.

According to a twelfth aspect, the present invention provides a supercapacitor comprising a dilute electrolyte (where dilute means having a salt concentration less than the 23° C. saturation concentration, such that the conductivity is less than 50% of the saturated electrolyte) with an Effective Capacitance (Ce) at 100 ms of at least 75% of that for an undiluted electrolyte. It can be appreciated that this lower concentration and thus lower conductivity will result in higher initial ESR of the supercapacitor using diluted rather than undiluted electrolyte. However, if the Effective Capacitance (Ce) of the devices are high, this difference in initial ESR is not significant.

According to a thirteenth aspect, the present invention provides a supercapacitor having an initial ESR (ESRi), of less than 1.0 $\Omega \cdot cm^2$ (Ohm centimeters squared). The area used to calculate a specific ESR is the planar (or XY) superficial area of the electrode pair(s) separated by a separator.

According a fourteenth aspect, the present invention provides an at least 5.5V supercapacitor comprising MTEMTFB in PN as electrolyte and having an initial capacitance (C) of at least 10 F/g, an Effective Capacitance (Ce) at 100 ms of at least 1 F/g and an initial ESR (ESRi) of less than 1.0 $\Omega \cdot cm^2$.

According to a fifteenth aspect, the present invention provides a device with a high peak power load to average power load ratio (being >2) incorporating an energy storage device or a supercapacitor of the seventh to fourteenth aspects. Such devices include, but are not limited to devices such as: wireless communication devices, for example, mobile telephones, PDA's, wireless LAN and PCMCIA cards, AMR's, toll tags; Compact Flash cards or USB connected devices; an LED-based camera flash; actuators, and; computer processors. Other devices are in the form of an electrical vehicle or hybrid electrical vehicle. It will be appreciated that the devices of the present invention are especially suited to those applications where high voltage and/or high temperature use is expected, and where design considerations would render bulky "can" type supercapacitors unsuitable.

Preferably, when the energy storage devices of the present invention are used they are in the form of a supercapacitor having a plurality of supercapacitive cells. The cells are preferably connected in series, but may also be connected in parallel.

DESCRIPTION

Figure 1:
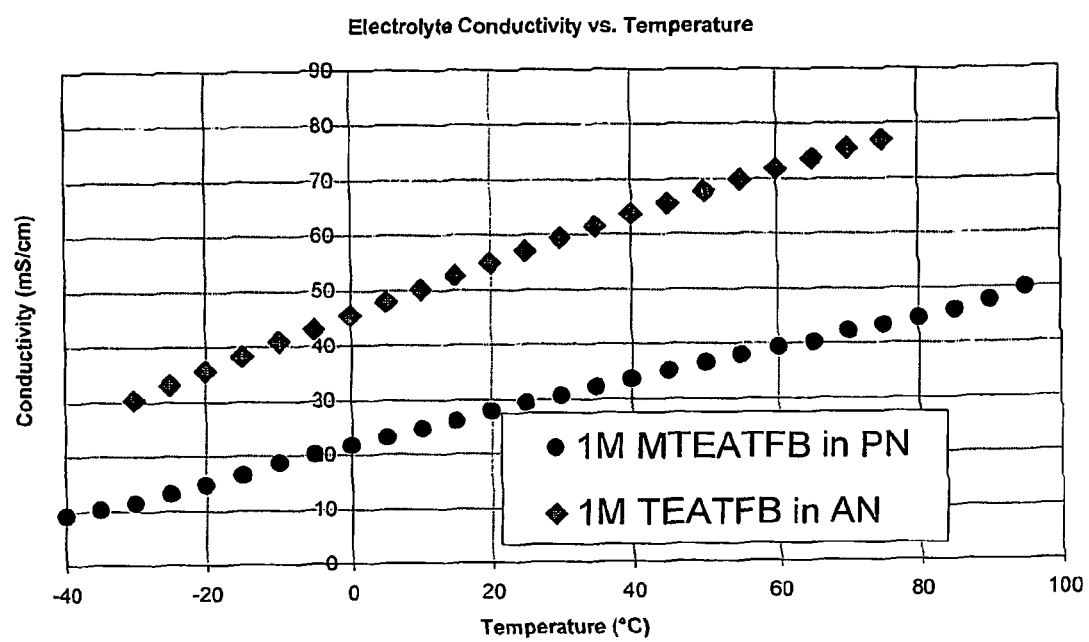
FIG. 1 shows the conductivity as a function of temperature for one molar (1M) MTEATFB in propionitrile and 1M TEATFB in acetonitrile.

The present invention is described with reference to the supercapacitors developed by the present applicant and disclosed in detail in the applicants copending applications, for example, PCT/AU98/00406, PCT/AU99/00278, PCT/AU99/00780, PCT/AU99/01081, PCT/AU00/00836 and PCT/AU01/00553. It will be understood by those skilled in the art that the present application uses those supercapacitors and that in the present instance, the electrolyte is the variable of interest. However, it will also be appreciated by those skilled in the art that the electrolyte solutions of the present application will be equally applicable for use in other energy storage devices of different design.

Acetonitrile (AN) is widely used as the sole solvent component of electrolyte systems because it has a high dielectric constant (38 at 20° C.) and a low viscosity (0.369 cP at 20° C.). Acetonitrile also has a low freezing point, malting it suitable for low temperature applications. However, acetonitrile boils at 82° C. which means that near or above this temperature it is necessary to contain the vapour, and additional challenges need to be met in respect of ensuring the mechanical integrity of any packaging of devices which use AN at or above this temperature.

As mentioned, it is important that the electrolyte has as high a conductivity and as low a contribution to device ESR as possible. High conductivity can be achieved primarily by using a low viscosity (or, in practical terms, low boiling) solvent, although in order for high conductivity, it is also necessary for the solvent to have a good dielectric constant to enable it to dissolve ionic species.

Combinations of solvents have been disclosed previously in our copending PCT/AU03/00334 but the use of single solvents can simplify production requirements, if the intended operational requirements permit.

Surprisingly, it has been found that propionitrile is suitable for use in devices such as supercapacitors, and can allow a variety of performance parameters to be met.

Also surprisingly, it has been found that improved performance can be obtained when using MTEATFB as an ion source.

Most particularly, the combination of propionitrile and MTEATFB provides beneficial properties for a wide range of operating requirements.

Electrolytes were prepared by mixing commercial high purity solvent with dried high purity commercial salts as described in the experimental section below.

An energy storage device according to one embodiment of the present invention may provide a low ESR rise rate, being less than or equal to 0.217 Ohm·cm$^2$ per 1000 hours of operation at 2.75 V and 70° C.

An energy storage device according to one embodiment of the present invention may provide a high voltage, being equal or greater than 2.75V.

An energy storage device according to one embodiment of the present invention may permit operation over a wide range of temperatures, being between −50° C. and +95° C.

An energy storage device according to one embodiment of the present invention may permit operation at high temperatures, being up to +95° C.

An energy storage device according to one embodiment of the present invention may permit operation at low temperatures, being as low as −50° C.

An energy storage device according to one embodiment of the present invention may have an initial ESR (ESRi) of between 0.1 and 1.0 Ω·cm$^2$.

EXAMPLES

General Procedure

Dried, recrystallised MTEATFB was used throughout.

Solvents used in this experiment were obtained from Merck Germany with the highest quality available i.e. Selectipur® or 99+% were run through a chromatography column packed with about 10 cm of γ alumina. The moisture content in the final product was estimated by Karl Fischer titration to be <5 ppm. Once the salt was added, the mixture was shaken well until all salts were dissolved.

Solutions of MTEATFB were 1 molar unless otherwise indicated.

The conductivity of these electrolytes were measured inside a dry nitrogen atmosphere in a glove box using a handheld ULTRAMETER (Model 6P) from Nyron L Company in accordance with the recommended procedure in the operating manual.

Unless otherwise stated, a cell of electrode area 28 cm$^2$ was used to generate results. For the cells, two carbon-coated electrodes were cut to a size of 28 cm$^2$ excluding terminals. The electrodes are cut such that they are 8 cm×3.5 cm. The terminals were approximately 4 cm long and were 2.5 cm from the corner along the longest edge. One electrode was folded in half such that the carbon was facing inwards. The second electrode was folded in half such that the carbon was facing outwards. This second electrode was encompassed in a membrane separator and the membrane-encased electrode was slid into the first electrode. Unless stated otherwise a 40 μm polyolefin membrane was used. Those skilled in the art will appreciate that both the materials and the thickness of the membranes can be varied considerably without effecting the overall functionality of the device. The carbon layers were facing each other with a separator in between. The device was assembled so that the terminals were both pointing in the same direction.

A multilayer soft packaging laminate was wrapped around the electrodes allowing the terminals to protrude to the outside of the packet. The packet was heat sealed leaving one end open. The cell was dried using heat (70° C.) and vacuum. The packet was filled with enough electrolyte to cover the electrodes and sealed. The sealed packet was pierced and taken to a tight vacuum. The packet was sealed again close to the electrode stack to complete the standard test cell.

Examples of electrode arrangements may be found in our copending applications PCT/AU01/01613 and PCT/AU01/01590, the contents of which are incorporated herein by reference.

The cell was then cycled between a low voltage and the voltage at which the cell was to be used. Electrical testing was then performed. Cell initial ESR measurements were taken, at voltage as per the industry standard, which in the present case is 2.3 V, at 1 kHz. Device initial ESR measurements were taken at 4.5 V unless otherwise stated. During testing of ESR change with time ('life testing') measurements were made by measuring voltage drop 50 μs (microsecond) into a 2 A (Ampere) current pulse. ESR measurements during Effective Capacitance measurements were measured 20 μs into the constant current 100 mA (milli-Ampere) discharge. Capacitance was measured using a discharge current of 0.2 A.

Experimental errors in observed values have not been quoted here, although those skilled in the art will be familiar with the precision and accuracy with which such values are normally determined.

The cell, for a nominally 6 μm thick coating and nominally 40 μm thick separator membrane, has a volume in the order of $1.23 \times 10^{-6}$ m$^3$ and a weight of 1.76 g including the multilayer packaging laminate.

The cell, for a nominally 6 μm thick coating and nominally 40 μm thick separator membrane, has a volume in the order of $2.66 \times 10^{-7}$ m$^3$ and a weight of 0.42 g neglecting the multilayer packaging laminate.

Descriptions of the construction of multilayered electrode stack devices are disclosed in our copending application PCT/AU01/01613, the contents of which are incorporated herein by reference. In the present case, the electrode area was 27.2 cm$^2$.

The cell comprised a multiple layered electrode stack, for a nominally 6 μm thick coating and nominally 40 μm thick separator membrane, has a volume in the order of $6.34 \times 10^{-7}$ m$^3$ and a weight of 0.74 g including the multilayer packaging laminate. Each stack typically included 8 pairs of electrodes with interleaved separators.

The cell comprised of a multiple layered electrode stack, for a nominally 6 μm thick coating and nominally 40 μm thick separator membrane, has a volume in the order of $2.82 \times 10^{-7}$ m$^3$ and a weight of 0.35 g neglecting the multilayer packaging laminate.

The two cell device comprised of two multiple layered electrode stacks connected in series, for a nominally 6 μm thick coating and nominally 40 μm thick separator membrane, has a volume in the order of $1.27 \times 10^{-6}$ m$^3$ and a weight of 1.48 g including the multilayer packaging laminate.

The two cell device comprised of two multiple layered electrode stacks connected in series, for a nominally 6 μm thick coating and nominally 40 μm thick separator membrane, has a volume in the order of $5.64 \times 10^{-7}$ m$^3$ and a weight of 0.70 g neglecting the multilayer packaging laminate.

In another embodiment a two-cell device comprised of two eight layered electrode stacks connected in series within a single laminate package and separated by a 20 μm thick polymer barrier layer. For a nominally 6 μm thick coating and nominally 40 μm thick separator membrane, this two-cell, single packaged device has a volume in the order of $1.14 \times 10^{-6}$ m$^3$ and a weight of 1.09 g.

Example 1

The conductivity of 1M MTEATFB in PN was measured at a range of temperatures and compared with corresponding values for 1M TEATFB in AN. The results are shown in FIG. 1, where it can be seen that the conductivity of the electrolyte MTEATFB in PN is lower than that for TEATFB in AN across a wide range of temperatures.

Example 2

Figure 2:
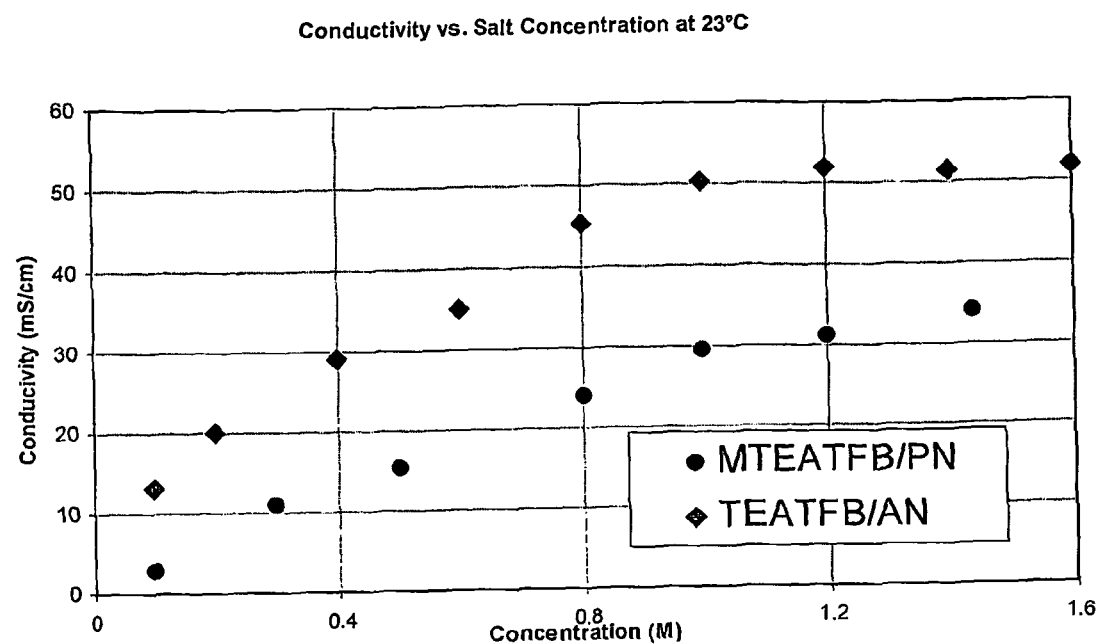
FIG. 2 shows the conductivity as a function of salt concentration for MTEATFB in propionitrile and 1M TEATFB in acetonitrile at 23° C.

The conductivity of MTEATFB in PN at 23° C. was measured at a variety of concentrations and again compared with corresponding values for TEATFB in AN at 23° C. The results are shown in FIG. 2, where it can be seen that the conductivity of MTEATFB/PN is dependent upon MTEATFB concentration. For any given salt concentration, MTEATFB/PN is lower than TEATFB in AN.

Supercapacitors were prepared as described in the experimental section above. One group of supercapacitors was filled with the state of the art electrolyte solution, a solution of 1M TEATFB in acetonitrile. Another group of supercapacitors was filled with 1M MTEATFB in propionitrile.

Example 3

Figure 3:
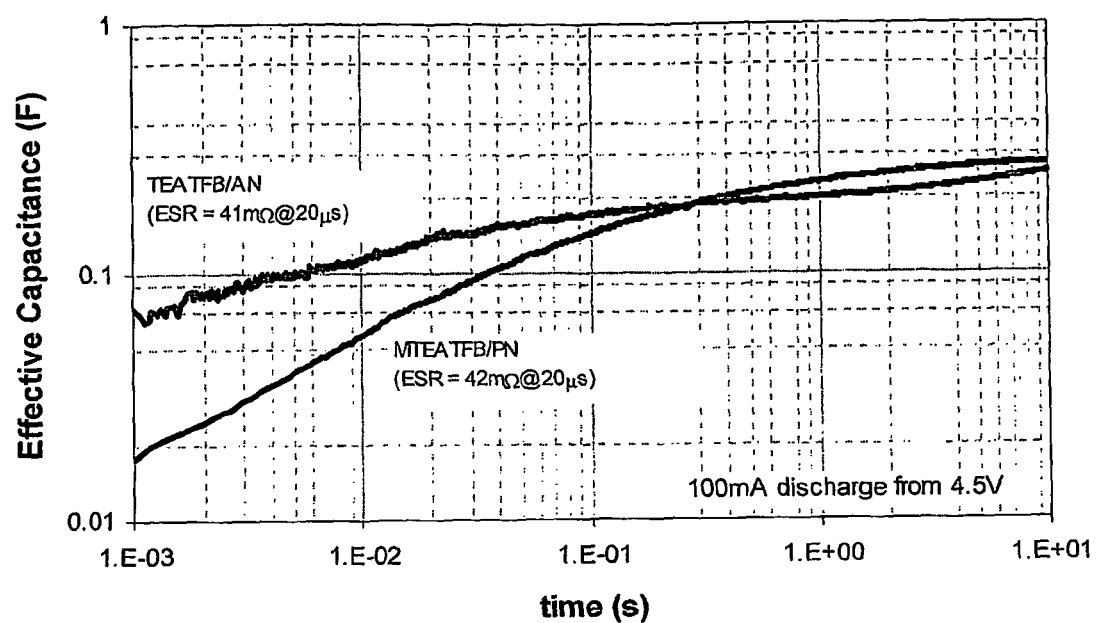
FIG. 3 shows Effective Capacitance (Ce) for dual cell devices discharged at 100 mA from 4.5 V comprising electrolytes of 1M MTEATFB in propionitrile and 1M TEATFB in acetonitrile at 23° C.

Effective Capacitance (Ce) for two identical dual-cell devices discharged from 4.5V at 100 mA was determined, where the only difference was the electrolyte. The results are shown in FIG. 3. The figure is limited to the time range 0.001 to 10 seconds, but it can be appreciated that data extends to both shorter and longer time scales. An initial voltage of 4.5V was chosen to allow direct comparison of the MTEATFB/PN device with the less voltage stable TEATFB/AN device.

The ESR rise rates of a MTEATFB/PN supercapacitor was compared with that of a corresponding TEATFB/AN supercapacitor at a variety of temperatures.

Example 4

A MTEATFB/PN supercapacitor and conventional TEATFB/AN supercapacitor were tested for ESR rise rate over 1000 hours at 2.30V and 25° C. The MTEATFB/PN supercapacitor showed a considerably more acceptable (lower) ESR rise rate than TEATFB/AN. The MTEATFB/PN supercapacitor showed a rise rate of 0.027 Ohm·cm$^2$ (Ohm centimeters squared) per 1000 hours compared to a rise rate of 0.087 Ohm·cm$^2$/kHr for the TEATFB/AN supercapacitor.

Example 5

A MTEATFB/PN supercapacitor and conventional TEATFB/AN supercapacitor were tested for ESR rise rate over 1000 hours at 2.30V and 0° C. The MTEATFB/PN supercapacitor again showed a considerably more acceptable (lower) ESR rise rate than TEATFB/AN. The MTEATFB/PN supercapacitor showed a rise rate of 0.016 Ohm·cm$^2$/kHr compared to a rise rate of 0.027 Ohm·cm$^2$/kHr for the TEATFB/AN supercapacitor.

Example 6

A MTEATFB/PN supercapacitor and conventional TEATFB/AN supercapacitor were tested for ESR rise rate over 1000 hours at 2.75V and 50° C. The MTEATFB/PN supercapacitor again showed a considerably more acceptable (lower) ESR rise rate than TEATFB/AN. The MTEATFB/PN supercapacitor showed a rise rate of 0.182 Ohm·cm$^2$/kHr compared to a rise rate of 0.503 Ohm·cm$^2$/kHr for the TEATFB/AN supercapacitor.

Example 7

A MTEATFB/PN supercapacitor and conventional TEATFB/AN supercapacitor were tested for ESR rise rate over 1000 hours at 2.75V, 70° C. and a relative humidity (RH) of 40%. The MTEATFB/PN supercapacitor again showed a considerably more acceptable (lower ESR rise rate) than TEATFB/AN. The MTEATFB/PN supercapacitor showed a rise rate of 0.217 Ohm·cm$^2$/kHr compared to a rise rate of 0.880 Ohm·cm$^2$/kHr for the TEATFB/AN supercapacitor.

Example 8

A MTEATFB/PN supercapacitor was tested for ESR over 1000 hours at 2.30V and 90° C. The rise rate was less than 1.261 Ohm·cm$^2$/kHr. No comparison with TEATFB/AN supercapacitors was possible due to their instability under these temperature conditions.

It will be clear to those skilled in the art that altering the physical properties, including the density of the coating, the thickness of the coating, the density of the separator, the thickness of the separator and or the density of the multilayer soft packaging laminate or the thickness of the multilayer soft packaging laminate or the thickness or density of the current collector will alter the volume and thickness of the cells similarly.

The claims defining the invention are as follows:

1. An energy storage device comprising an electrolyte, said electrolyte consisting of propionitrile as a solvent and methyltriethylammonium tetrafluoroborate (MTEATFB) as an ionic species.

2. The energy storage device according to claim 1 wherein the ionic species is present in an amount up to saturation.

3. The energy storage device according to claim 2 wherein the ionic species is present in an amount of 1M.

4. The energy storage device according to claim 1 which is a supercapacitor which provides a low ESR rise rate, being less than or equal to 0.217 Ohm·cm$^2$ per 1000 hours of operation at 2.75 V and 70° C.

5. The energy storage device according to claim 1 which is a supercapacitor which provides a high voltage, being equal or greater than 2.75V.

6. The energy storage device according to claim 1 which is a supercapacitor which permits operation over a wide range of temperatures, being between −50° C. and +95° C.

7. The energy storage device according to claim 1 which is a supercapacitor which permits operation at high temperatures, being up to +95° C.

8. The energy storage device according to claim 1 which is a supercapacitor which permits operation at low temperatures, being as low as −50° C.

9. An energy storage device according to claim 1 wherein the energy storage device is a supercapacitor.

10. An energy storage device according to claim 1 wherein the energy storage device is a carbon based supercapacitor.

11. An energy storage device according to claim 1 comprising a plurality of opposed pairs of stacked electrodes in a spaced apart array.

12. The energy storage device according to claim 9 having an Effective Capacitance (Ce) at 100 ms of at least 1 F/g of electrode coating.

13. The energy storage device according to claim 9 having an initial capacitance (C) of at least 10 F/g of electrode coating.

14. The energy storage device according to claim 9 having an initial ESR (ESRi) of between 0.1 and 1.0 Ω·cm$^2$.

15. The energy storage device according to claim 9 comprising:
    a charge storage cell including:
      (a) a first electrode;
      (b) a second electrode being opposed to and spaced apart from the first electrode; and
      (c) a porous separator disposed between the electrodes;
    a sealed package for containing the cell and an electrolyte in which the cell is immersed; and
    at least two terminals extending from the package to allow external electrical connection to the cell.

16. The energy storage device according to claim 9 in the form of a flexible charge storage device including:
    a first sheet electrode having a first terminal extending therefrom;
    a second sheet electrode disposed adjacent to the first electrode and having a second terminal extending therefrom;
    a porous separator disposed between the electrodes; and
    a sealed package for containing the electrodes, the separator and an electrolyte, whereby the terminals extend from the package to allow electrical connection to the respective electrodes and the package includes a plurality of layers, one of the layers being an electrolyte barrier layer and a strengthening layer.

17. An energy storage device comprising an electrolyte, said electrolyte consisting of propionitrile as a solvent and methyltriethylammonium tetrafluoroborate (MTEATFB) as an ionic species; wherein the energy storage device is a supercapacitor having an Effective Capacitance (Ce) at 100 ms of at least 1 F/g of electrode coating, an initial capacitance (C) of at least 10 F/g of electrode coating and an initial ESR (ESRi) of less than 1.0 Ω·cm$^2$.

18. The energy storage device according to claim 17 wherein the ionic species is present in an amount up to saturation.

19. The energy storage device according to claim 18 wherein the ionic species is present in an amount of 1M.

20. The energy storage device according to claim 17, wherein the supercapacitor provides a low ESR rise rate, being less than or equal to 0.217 Ohm·cm$^2$ per 1000 hours of operation at 2.75 V and 70° C.

21. The energy storage device according to claim 17, wherein the supercapacitor provides a high voltage, being equal or greater than 2.75V.

22. An energy storage device according to claim 17, wherein the supercapacitor is carbon based.

23. An energy storage device according to claim 17, comprising a plurality of opposed pairs of stacked electrodes in a spaced apart array.

24. The energy storage device according to claim 17, wherein the supercapacitor has an initial capacitance (C) of at least 10 F/g of electrode coating.

25. The energy storage device according to claim 17, wherein the supercapacitor has an initial ESR (ESRi) of between 0.1 and 1.0 Ω·cm$^2$.

26. A supercapacitor comprising a MTEATFB/PN electrolyte, said supercapacitor being capable of operation at temperatures between −50° C. and +95° C.

27. The supercapacitor according to claim 26 wherein the MTEATFB is present in an amount up to saturation.

28. The supercapacitor according to claim 27 wherein the MTEATFB is present in an amount of 1M.

29. The supercapacitor according to claim 26, wherein the supercapacitor provides a low ESR rise rate, being less than or equal to 0.217 Ohm·cm$^2$ per 1000 hours of operation at 2.75 V and 70° C.

30. The supercapacitor according to claim 26, wherein the supercapacitor provides a high voltage, being equal or greater than 2.75V.

31. The supercapacitor according to claim 26, wherein the supercapacitor is carbon based.

32. The supercapacitor according to claim 26, further comprising a plurality of opposed pairs of stacked electrodes in a spaced apart array.

33. The supercapacitor according to claim 26 having an Effective Capacitance (Ce) at 100 ms of at least 1 F/g of electrode coating.

34. The supercapacitor according to claim 26 having an initial capacitance (C) of at least 10 F/g of electrode coating.

35. The supercapacitor according to claim 26 having an initial ESR (ESRi) of between 0.1 and 1.0 $\Omega \cdot cm^2$.

36. The supercapacitor according to claim 26, wherein supercapacitor has an Effective Capacitance (Ce) at 100 ms of at least 1 F/g of electrode coating, an initial capacitance (C) of at least 10 F/g of electrode coating and an initial ESR (ESRi) of less than 1.0 $\Omega \cdot cm^2$.

* * * * *

UNITED STATES PATENT AND TRADEMARK OFFICE
CERTIFICATE OF CORRECTION

PATENT NO. : 8,475,676 B2
APPLICATION NO. : 12/223111
DATED : July 2, 2013
INVENTOR(S) : Aitchison et al.

It is certified that error appears in the above-identified patent and that said Letters Patent is hereby corrected as shown below:

In the Specification

In the section entitled BACKGROUND ART, at column 1, line 49:
Delete "devices." and insert therefor --devices,--;

at column 2, line 33:
Delete "$\epsilon$ is the" and insert therefor --$\varepsilon$ is the--;

In the section entitled SUMMARY OF THE INVENTION, at column 6, line 36:
Delete "a non aqueous solvent More" and insert therefor --a non aqueous solvent. More--;

at column 8, line 55:
Delete "According a" and insert therefor --According to a--;

In the section entitled DESCRIPTION, at column 9, line 44:
Delete "malting" and insert therefor --making--.

Signed and Sealed this
Tenth Day of September, 2013

Teresa Stanek Rea
*Acting Director of the United States Patent and Trademark Office*